US011634038B2

(12) United States Patent
Oya

(10) Patent No.: US 11,634,038 B2
(45) Date of Patent: Apr. 25, 2023

(54) FUEL CELL SYSTEM INSTALLED IN VEHICLE

(71) Applicant: TOYOTA JIDOSHA KABUSHIKI KAISHA, Toyota (JP)

(72) Inventor: Ryosuke Oya, Toyota (JP)

(73) Assignee: TOYOTA-SHI, AICHI-KEN, JAPAN, Toyota (JP)

( * ) Notice: Subject to any disclaimer, the term of this patent is extended or adjusted under 35 U.S.C. 154(b) by 514 days.

(21) Appl. No.: 16/983,033

(22) Filed: Aug. 3, 2020

(65) Prior Publication Data

US 2021/0101492 A1 Apr. 8, 2021

(30) Foreign Application Priority Data

Oct. 8, 2019 (JP) .............................. JP2019-184900

(51) Int. Cl.
*B60L 50/75* (2019.01)
*B60L 53/22* (2019.01)
(Continued)

(52) U.S. Cl.
CPC .............. *B60L 50/75* (2019.02); *B60L 1/003* (2013.01); *B60L 53/22* (2019.02); *B60W 50/0205* (2013.01); *B60W 50/029* (2013.01); *H01M 8/0494* (2013.01); *H01M 8/04111* (2013.01); *H01M 8/04686* (2013.01); (Continued)

(58) Field of Classification Search
CPC .......... B60L 50/75; B60L 1/003; B60L 53/22; B60W 50/0205; B60W 50/029; H01M 8/04111; H01M 8/04686; H01M 8/04917; H01M 8/0494; H01M 8/04947; H01M 16/006; H01M 2220/20; H01M 2250/402; H01M 8/043; H01M 8/04925; Y02T 10/70; Y02T 10/7072; Y02T 10/72; Y02T 90/40

See application file for complete search history.

(56) References Cited

U.S. PATENT DOCUMENTS

| 8,673,514 | B2* | 3/2014 | Igarashi | ................ | H02M 3/158 |
| | | | | | 429/432 |
| 2007/0007058 | A1* | 1/2007 | Uenodai | ................ | B60K 28/16 |
| | | | | | 180/65.28 |

(Continued)

FOREIGN PATENT DOCUMENTS

| JP | 2017139150 A | 8/2017 |
| JP | 2018181834 A | 11/2018 |

*Primary Examiner* — Erez Gurari
(74) *Attorney, Agent, or Firm* — Dickinson Wright, PLLC

(57) ABSTRACT

A fuel cell system installed in a vehicle includes: a fuel cell; a secondary battery; a load including a drive motor and an air compressor; a fuel cell converter; a secondary battery converter; a failure detection unit; a first state determination unit; a reverse rotation detection unit; and a control unit. The control unit performs a limp-home traveling control that supplies electric power from the secondary battery to the drive motor when the secondary battery converter fails. When the vehicle is not in the first state, the control unit prohibits regeneration of the drive motor. When the vehicle is in the first state, the control unit supplies a reaction current to the air compressor. When the reaction current is applied and a reverse rotation of the air compressor is detected, the control unit does not apply the reaction current thereafter.

3 Claims, 3 Drawing Sheets

(51) Int. Cl.
*B60W 50/02* (2012.01)
*B60W 50/029* (2012.01)
*B60L 1/00* (2006.01)
*H01M 16/00* (2006.01)
*H01M 8/04858* (2016.01)
*H01M 8/04664* (2016.01)
*H01M 8/04111* (2016.01)

(52) U.S. Cl.
CPC ... *H01M 8/04917* (2013.01); *H01M 8/04947* (2013.01); *H01M 16/006* (2013.01); *H01M 2220/20* (2013.01); *H01M 2250/20* (2013.01); *H01M 2250/402* (2013.01)

(56) References Cited

U.S. PATENT DOCUMENTS

| | | | | |
|---|---|---|---|---|
| 2007/0054166 A1* | 3/2007 | Ojima | ............... | H01M 8/04753 429/408 |
| 2010/0244849 A1* | 9/2010 | Yano | ............ | G01R 31/52 324/510 |
| 2016/0114793 A1* | 4/2016 | Saito | ............ | B60L 58/33 701/22 |
| 2016/0137095 A1* | 5/2016 | Oda | ............ | B60L 58/40 701/22 |
| 2016/0141673 A1* | 5/2016 | Kakeno | ............ | H01M 8/04925 429/444 |
| 2016/0141682 A1* | 5/2016 | Yamanaka | ............ | H01M 8/04089 429/446 |
| 2016/0240872 A1* | 8/2016 | Hoshi | ............ | H01M 8/04529 |
| 2016/0347200 A1* | 12/2016 | Matsusue | ............ | H01M 8/0491 |
| 2018/0019489 A1* | 1/2018 | Kakeno | ............ | H01M 8/04544 |
| 2018/0111502 A1* | 4/2018 | Matsuo | ............ | H01M 8/04619 |
| 2018/0111503 A1* | 4/2018 | Araki | ............ | B60L 50/72 |
| 2018/0118050 A1* | 5/2018 | Choi | ............ | G05D 1/0022 |
| 2018/0215283 A1* | 8/2018 | Matsusue | ............ | B60L 58/40 |
| 2018/0277869 A1* | 9/2018 | Kusano | ............ | H01M 8/0267 |
| 2018/0290559 A1* | 10/2018 | Oya | ............ | B60L 58/40 |
| 2018/0358636 A1* | 12/2018 | Sato | ............ | H01M 8/04753 |
| 2020/0036023 A1* | 1/2020 | Ogawa | ............ | B60L 58/34 |
| 2021/0101492 A1* | 4/2021 | Oya | ............ | H01M 16/006 |
| 2021/0143459 A1* | 5/2021 | Ikeda | ............ | H01M 8/04179 |
| 2022/0336832 A1* | 10/2022 | Lawes | ............ | B60L 58/31 |

* cited by examiner

FUEL CELL SYSTEM INSTALLED IN VEHICLE

INCORPORATION BY REFERENCE

The disclosure of Japanese Patent Application No. 2019-184900 filed on Oct. 8, 2019 including the specification, drawings and abstract is incorporated herein by reference in its entirety.

BACKGROUND

1. Technical Field

The present disclosure relates to a fuel cell system installed in a vehicle.

2. Description of Related Art

Japanese Unexamined Patent Application Publication No. 2018-181834 (JP 2018-181834 A) describes a fuel cell system including a fuel cell, a secondary battery, and a boost converter provided on each output side of the fuel cell and the secondary battery. In the fuel cell system, when the secondary battery converter fails, an input side and the output side of the secondary battery converter are conductively connected, and the fuel cell is controlled to attain a target voltage that is calculated based on a boost ratio of the fuel cell converter and an output voltage of the secondary battery converter for boosting to supply electric power from the fuel cell to a load, such as a drive motor.

SUMMARY

In a case in which the secondary battery converter fails and the input side and the output side of the secondary battery converter are conductively connected, when the electric power supplied from the fuel cell to the drive motor is surplus, it is not possible to step down the voltage of the surplus electric power with the secondary battery converter and charge the secondary battery. Thus, stopping the electric power supply from the fuel cell and continuing to supply electric power to the drive motor by using the output from the secondary battery can be considered. In such a case, for example, in a fuel cell vehicle equipped with a regenerative brake using a regenerative electric power of the drive motor as a braking force, the secondary battery cannot be charged with the regenerative electric power. Thus, using the output from the secondary battery to cause the vehicle to perform limp-home traveling and prohibiting regeneration can be considered. However, if regeneration is uniformly prohibited, the following situation may occur.

For example, assumed is a case in which an operator of the vehicle tries to move the vehicle forward by performing a step change from a brake pedal to an accelerator pedal, in a state in which the vehicle is stopped on an uphill road by depression of the brake pedal. In such a case, a vehicle speed becomes negative since the vehicle is temporarily reversed on slope and a drive motor attains a positive torque by the accelerator pedal being stepped on by the operator, which corresponds to a state in which reverse regeneration in a four quadrant drive is performed. In the vehicle, braking force is generated by regeneration of the drive motor to suppress reverse travel so that forward traveling on the slope becomes possible. However, if regeneration is prohibited when the secondary battery converter fails, it will be difficult to start the vehicle on the slope by using the regenerative brake.

Since the fuel cell vehicle is equipped with an air compressor for supplying oxygen to the fuel cell, it is possible to consider consuming the electric power generated by regeneration when the vehicle starts after the vehicle is stopped on a slope by applying a reactive current to the air compressor to start the vehicle on the slope by using the regenerative brake.

In recent years, an air compressor capable of rotating at high speed is being adopted in fuel cell vehicles. In such an air compressor, components such as bearings are more precise than conventional air compressors. For example, when the air compressor rotates in the reverse direction by supplying a reactive current, there is a possibility that the air compressor is damaged. However, a so-called secondary failure has not been considered until now. Here, a secondary failure is when the air compressor fails due to a reactive current being supplied to the air compressor when the fuel cell vehicle starts on a hill during performing limp-home traveling. Thus, a technique is desired in which the secondary failure of the air compressor can be suppressed in the system with which the vehicle performs limp-home traveling using the output from the secondary battery when the secondary battery converter fails.

According to the present disclosure, the following embodiments can be realized.

According to an aspect of the present disclosure, a fuel cell system installed in a vehicle is provided. The fuel cell system includes: a fuel cell; a secondary battery; a load including a drive motor having a function of a motor generating a driving force of the vehicle and a function of a generator generating a regenerative electric power, and an air compressor configured to supply oxygen to the fuel cell by rotating in one direction; a fuel cell converter configured to boost electric power from the fuel cell and output electric power to the load; a secondary battery converter that is provided between the secondary battery and the load, that is configured to boost electric power from the secondary battery and output electric power to the load, and that is configured to step down electric power for charging the secondary battery; a failure detection unit configured to detect an operation failure of the secondary battery converter; a first state determination unit configured to determine whether the vehicle is in a first state in which an actual traveling direction that is an actual direction in which the vehicle travels and a required traveling direction that is assumed based on a rotation direction of the drive motor do not match; a reverse rotation detection unit configured to detect a reverse rotation that is a rotation in a direction opposite to the one direction in the air compressor; and a control unit configured to control the fuel cell, the fuel cell converter and the secondary battery converter. The control unit is configured to stop supplying electric power to the load via the fuel cell converter and perform a limp-home traveling control for supplying electric power from the secondary battery to the drive motor with the secondary battery converter in a conductive state, when the operation failure of the secondary battery converter is detected. The control unit is configured to, in the limp-home traveling control: prohibit regeneration of the drive motor when the vehicle is not in the first state; apply a reactive current to the air compressor to cause the air compressor to consume regenerative electric power of the drive motor when the vehicle is in the first state; and not apply the reactive current to the air compressor after the reverse rotation of the air compressor is detected when the reactive current is applied to the air compressor and the reverse rotation is detected. According to this aspect, in the limp-home traveling control when the secondary battery converter fails, when the vehicle is in the first state, the regenerative electric power of the drive motor can be consumed by supplying the reactive current to the air compressor, a regenerative braking force can be acquired to suppress the rearward traveling of the vehicle, and the vehicle can travel in the request traveling direction. When the reverse rotation of the air compressor is detected, the reactive current is not supplied after the reverse rotation is detected. Thus, it is possible to suppress a so-called secondary failure in which the air compressor fails in addition to the failure of the secondary battery converter.

In the above aspect, the control unit may be configured to, when the reverse rotation of the air compressor is not detected in the limp-home traveling control: stop applying the reactive current when a continuous application time after the application of the reactive current to the air compressor is started has reached a predetermined first time; and restart applying the reactive current when a stop time after the application of the reactive current is stopped has reached a predetermined second time. According to this aspect, overheating of the air compressor can be suppressed. Thus, it is possible to suppress a secondary failure of the air compressor caused by overheating, in addition to the failure of the secondary battery converter.

In the aspect described above, the air compressor may be a turbo air compressor. According to the aspect, it is possible to suppress a secondary failure of the turbo air compressor.

The present disclosure is can be realized in various forms such as a control method of a fuel cell system installed in a vehicle, a computer program for realizing the control method, a non-transitory storage medium that stores the computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

A1. Fuel Cell System Configuration

Figure 1:
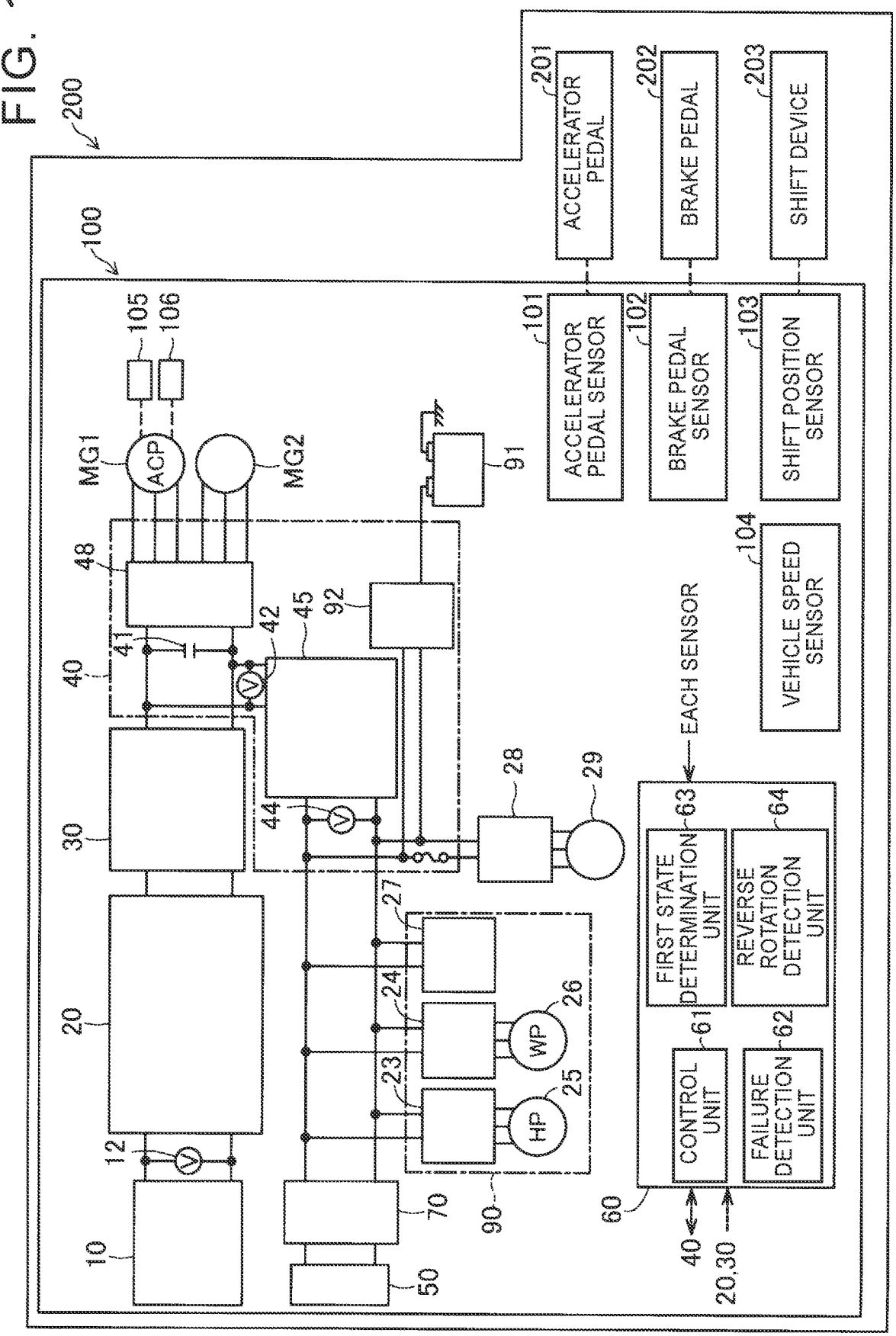
FIG. 1 shows a schematic configuration of a vehicle equipped with a fuel cell system.

FIG. 1 is a schematic configuration diagram showing a fuel cell system 100 according to an embodiment of the present disclosure. The fuel cell system 100 is provided in a vehicle 200. As illustrated in FIG. 1, the fuel cell system 100 is provided with a fuel cell 10 and a secondary battery 50 serving as electric power supply sources for a load, a fuel cell converter 20 (hereinafter also referred to as a "FDC 20"), a fuel cell (FC) relay circuit 30, a power control unit 40 (hereinafter, also referred to as a "PCU 40") including a secondary battery converter 45 (hereinafter, also referred to as a "BDC 45"), a control device 60, a secondary battery relay circuit 70, an auxiliary machine 90, an auxiliary battery 91, an auxiliary machine inverter 28, an air conditioner 29, an air compressor MG1 and a drive motor MG2 each serving as a load.

The fuel cell 10 is a cell in which hydrogen and oxygen, serving as reaction gases, are reacted with each other to generate electricity. The vehicle 200 equipped with the fuel cell system 100 has a hydrogen tank not shown in which hydrogen (fuel gas) serving as a reaction gas is stored, and hydrogen is supplied from the hydrogen tank to the fuel cell 10. The air compressor MG1 is rotated in one direction to compress the air in the atmosphere, and the air containing oxygen (oxidizing gas) serving as a reaction gas is supplied from the air compressor MG1 to the fuel cell 10. The air compressor MG1 in the present embodiment is a turbo air compressor. In the air compressor MG1 of the present embodiment, components such as bearings are cooled by circulating oil. In other embodiments, the air compressor MG1 is not limited to a turbo type and may be a Roots type.

The FDC 20 boosts the output voltage of the fuel cell 10 to a drive voltage of the air compressor MG1 and the drive motor MG2. A voltage sensor 12 that detects the output voltage of the fuel cell 10 is provided between the FDC 20 and the fuel cell 10. The FC relay circuit 30 switches between a connection state in which the FDC 20 and the PCU 40 are conductively connected and a disconnection state in which the FDC 20 and the PCU 40 are electrically disconnected. The FC relay circuit 30 is disposed between the FDC 20 and the PCU 40.

The drive motor MG2 is a motor driven by electric power supplied from the fuel cell 10 and the secondary battery 50, and is connected in parallel with the air compressor MG1. The drive motor MG2 operates as a motor or a generator. When the drive motor MG2 operates as a motor, the drive motor MG2 drives driving wheels of the vehicle 200 using the electric power supplied from the fuel cell 10 and the secondary battery 50. The drive motor MG2 generates regenerative electric power when operating as a generator to obtain a braking force.

The auxiliary machine 90 consumes the electric power generated by the fuel cell 10. The auxiliary machine 90 includes a hydrogen pump 25, a coolant pump 26, auxiliary machine inverters 23 and 24, and a water heater 27. The hydrogen pump 25 recirculates the hydrogen off gas discharged from the fuel cell 10 to the fuel cell 10. The coolant pump 26 circulates the coolant used in the fuel cell 10. The auxiliary machine inverters 23 and 24 convert a direct current into a three-phase alternating current and supply the converted current to the hydrogen pump 25 and the coolant pump 26 for drive control.

The secondary battery 50 outputs electric power for driving the air compressor MG1 and the drive motor MG2. For the secondary battery 50, a lithium ion battery or a nickel hydride battery is used, for example. The secondary battery 50 can be charged with the electric power generated by the fuel cell 10 and the regenerative electric power from the drive motor MG2. The secondary battery relay circuit 70 switches between a connection state in which the secondary battery 50 and the PCU 40 are conductively connected and a disconnection state in which the secondary battery 50 and the PCU 40 are electrically disconnected. The output voltage from the secondary battery 50 is detected by a voltage sensor 44 connected to the secondary battery relay circuit 70.

The auxiliary battery 91 is used as a power source for a low voltage auxiliary device of the vehicle. The auxiliary battery 91 is conductively connected between the secondary battery relay circuit 70 and the BDC 45 via a DC/DC converter 92. The auxiliary battery 91 is supplied with the electric power stepped down by the DC/DC converter 92.

The PCU 40 controls the electric power transmitted to the air compressor MG1 and the drive motor MG2 based on the control signal transmitted from the control device 60. The PCU 40 has a capacitor 41, an inverter 48, and the BDC 45.

The inverter 48 is connected to the air compressor MG1 and the drive motor MG2, which are loads. The inverter 48 converts the direct current electric power supplied from the fuel cell 10 or the secondary battery 50 into three-phase alternating current electric power when the drive motor MG2 operates as a motor. The inverter 48 converts three-phase alternating current electric power serving as regenerative electric power output from drive motor MG2 into direct current electric power when the drive motor MG2 operates as a generator.

The BDC 45 is a converter capable of stepping up and down, and lowers the output voltage from the FDC 20 for charging the secondary battery 50 and boosts the output voltage from the secondary battery 50 to the drive voltage of the air compressor MG1 and the drive motor MG2. In the present embodiment, when it is detected by a failure detection unit 62 described below that an operation failure of the BDC 45 has occurred, the BDC 45 electrically directly connects an input side and an output side of the BDC 45 so that the BDC 45 is switched to a conductive state in which the step-up operation and the step-down operation are restricted. In the conductive state, the voltage between the BDC 45 and the inverter 48 becomes the voltage of the secondary battery 50.

In the present embodiment, the fuel cell system 100 further includes an accelerator pedal sensor 101, a brake pedal sensor 102, a shift position sensor 103, a vehicle speed sensor 104, a rotation sensor 105, and a current sensor 106. The accelerator pedal sensor 101 detects a depression amount of an accelerator pedal 201 of the vehicle 200. The brake pedal sensor 102 detects a depression amount of a brake pedal 202 of the vehicle 200. The depression amount can also be referred to as an "operation amount". The shift position sensor 103 detects a shift position of a shift device 203 of the vehicle 200. The shift position includes a position indicating a forward traveling request and a position indicating a reverse traveling request of the operator for vehicle 200. The vehicle speed sensor 104 detects the vehicle speed from the rotation speed of a drive shaft of the vehicle 200. The vehicle speed sensor 104 outputs a positive vehicle speed when the vehicle 200 is traveling in a forward traveling direction, and outputs a negative vehicle speed when the vehicle 200 is traveling in a reverse traveling direction. The rotation sensor 105 detects the rotation direction of the air compressor MG1. In the present embodiment, the rotation sensor 105 is a resolver that detects the rotation speed of the air compressor MG1. The current sensor 106 detects the value of the current flowing through the air compressor MG1.

The control device 60 is configured as an ECU including a CPU, a memory, and an input/output interface. The CPU of the control device 60 functions as a control unit 61, the failure detection unit 62, a first state determination unit 63, and a reverse rotation detection unit 64 by loading and executing the program stored in the memory. The measured value of each sensor described above is input to the control device 60.

The failure detection unit 62 detects an operation failure of the BDC 45. The operation failure of the BDC 45 represents a state in which it is difficult for the fuel cell system 100 to normally perform either the step-up operation or the step-down operation by the BDC 45. The failure detection unit 62 can detect, for example, the failure of the BDC 45 when an overvoltage of the BDC 45 is detected from the measured values of the voltage sensors 42 and 44, or when an overheated state in which a temperature is equal to or higher than a predetermined reference temperature is detected by a temperature sensor (not shown) provided in the BDC 45.

The first state determination unit 63 determines whether the vehicle 200 is in the first state. The first state is a state in which an actual traveling direction that is an actual direction in which the vehicle 200 travels and a required traveling direction that is assumed according to the rotation direction of the drive motor MG2 do not match. Although details will be described below, in the present embodiment, the first state determination unit 63 uses input results of the accelerator pedal sensor 101, the shift position sensor 103, and the vehicle speed sensor 104 to determine whether the vehicle 200 is in the first state.

The reverse rotation detection unit 64 detects the rotation direction of the air compressor MG1 by using the input result from the rotation sensor 105 provided in the air compressor MG1. The reverse rotation detection unit 64 detects that the air compressor MG1 is rotating in the reverse direction when the air compressor MG1 is rotating in the direction opposite to the one direction in which the air compressor MG1 rotates to supply oxygen to the fuel cell 10.

The control unit 61 controls the operation of each unit in the fuel cell system 100 according to the signals input from each sensor described above. For example, the control unit 61 controls the inverter 48 to cause the drive motor MG2 to realize a function of generating a driving force by electric power from at least one of the fuel cell 10 and the secondary battery 50 and a function of serving as a generator that generates regenerative electric power. Further, when the failure of the BDC 45 is detected, the control unit 61 stops the electric power supply from the fuel cell 10 to the load via the FDC 30 and performs limp-home traveling control in which the BDC 45 is set in the conductive state and electric power is supplied from the secondary battery 50 to the drive motor MG2.

A2. About the First State

There is a case in which forward traveling is attempted with the depression of the accelerator pedal 201, from a state in which the vehicle 200 is stopped on the uphill road due to the depression of the brake pedal 202 and the shift position of the shift device 203 indicates a forward traveling request. There is a case in which the vehicle 200 slides down rearward by the time the operator of the vehicle 200 retreads from the brake pedal 202 to the accelerator pedal 201. When the accelerator pedal 201 is depressed while the vehicle 200 is slipping down, the required torque for the drive motor MG2 is positive and the drive motor MG2 rotates in the positive direction, however, the vehicle speed is negative, which corresponds to a state in which the reverse rotation regeneration in the four-quadrant operation is performed. Thus, regeneration is possible in the drive motor MG2. The above state is a state in which the actual traveling direction that is the actual direction in which the vehicle 200 travels, and the required traveling direction that is assumed according to the rotation direction of the drive motor MG2 do not match.

Similarly, there is a case in which reverse traveling is attempted with the depression of the accelerator pedal 201, from a state in which the vehicle 200 is stopped on a downward hill due to the depression of the brake pedal 202 and the shift position of the shift device 203 indicates a reverse traveling request. There is a case in which the vehicle 200 slides down forward and the vehicle speed becomes positive by the time the operator of the vehicle 200 retreads from the brake pedal 202 to the accelerator pedal 201. When the accelerator pedal 201 is depressed while the vehicle is sliding down, the required torque for the drive motor MG2 is negative and the drive motor MG2 rotates in the negative direction, however the vehicle speed is positive, which corresponds to a state in which the normal rotation regeneration in the four-quadrant operation is performed. Thus, regeneration is possible in the drive motor MG2. The above state is also a state in which the actual traveling direction and the required traveling direction of the vehicle 200 do not match. In addition, the term "the vehicle 200 slides down" indicates that the vehicle 200 travels on a slope in a direction opposite to the required traveling direction.

The first state determination unit 63 determines that the vehicle 200 is in the first state when the vehicle speed is negative, a forward traveling request is detected by the shift position sensor 103, and the accelerator pedal 201 is depressed, or when the vehicle speed is positive, a reverse traveling request is detected by the shift position sensor 103, and the accelerator pedal 201 is depressed. The first state is a state in which the actual traveling direction of the vehicle 200 indicated by the vehicle speed sensor 104 and the required traveling direction indicated by the shift position sensor 103 are different from each other, and a state in which the accelerator pedal 201 is depressed and it can be determined that there is an attempt to transition to a state in which the two directions match. The first state is also a state in which regeneration is possible in the drive motor MG2 if there is a charging destination or a consuming destination for the regenerative electric power.

In the limp-home traveling control described above, the control unit 61 changes the control of the fuel cell system 100 depending on whether the vehicle 200 is in the first state.

A3. Limp-Home Traveling Control

Figure 2:
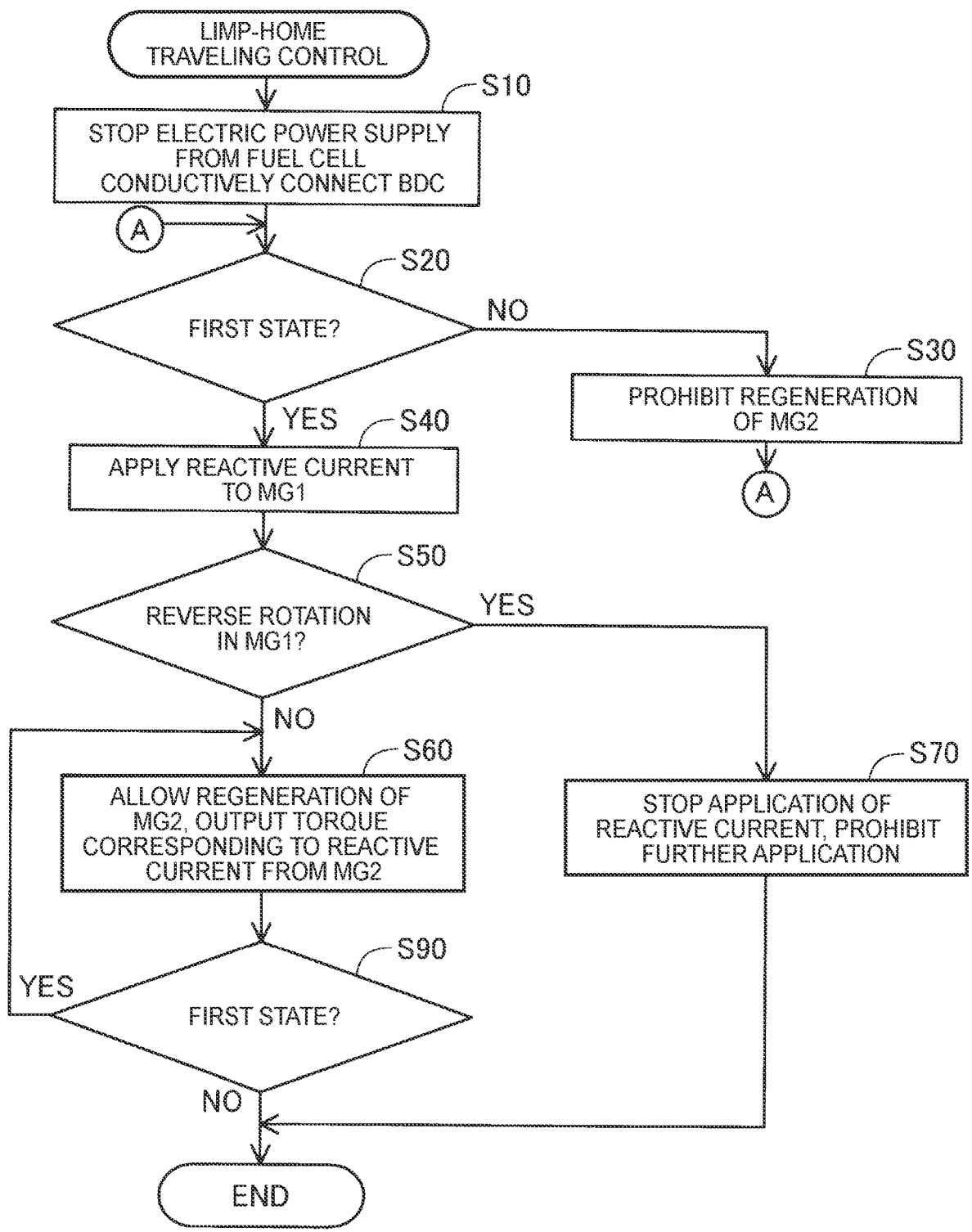
FIG. 2 is a process diagram showing a limp-home traveling control in a first embodiment.

FIG. 2 shows a limp-home control process in the first embodiment. The limp-home traveling control is repeatedly executed by the control unit 61 when a failure of the BDC 45 is detected by the failure detection unit 62. In the limp-home traveling control, the first state determination unit 63 sequentially determines whether vehicle 200 is in the first state.

In step S10, the control unit 61 stops the electric power generation in the fuel cell 10 to stop the electric power supply from the fuel cell 10 to the load, and conductively connects the input side and the output side of the BDC 45. The reason the electric power supply from the fuel cell 10 is stopped is that the surplus electric power of the electric power supplied from the fuel cell 10 to the air compressor MG1 cannot be stepped down by the BDC 45 to be charged into the secondary battery 50. By stopping the electric power supply from the fuel cell 10, it is possible to suppress failure of the capacitor 41 resulting from the surplus electric power that cannot be output to the secondary battery 50 from occurring. When the supply of electric power from the fuel cell 10 is already stopped and the input side and the output side of the BDC 45 are conductively connected due to the process shown in FIG. 2 being performed for the time being, the control unit 61 skips the process of step S10.

In step S20, when the state of vehicle 200 is not the first state (step S20, NO), the control unit 61 prohibits regeneration of the drive motor MG2 in step S30, and returns the process to step S20.

If the vehicle 200 is in the first state (step S20, YES), the control unit 61 first applies the reactive current to the air compressor MG1 using the output from the secondary battery 50 in step S40. The reactive current value is obtained in advance by experiments or simulations based on the current value that can be applied to the air compressor MG1 and the braking force required when starting on a slope.

In step S50, the reverse rotation detection unit 64 detects the rotation direction of the air compressor MG1 using the input result from the rotation sensor 105 provided in the air compressor MG1. Steps S40 and S50 are performed in order to confirm whether reverse rotation occurs in the air compressor MG1 by temporarily supplying the reactive current to the air compressor MG1 by the output from the secondary battery 50. When the reactive current is applied, the air compressor MG1 may be rotated. This is due to an assembly error or the like of components that configure the air compressor MG1.

When the rotation speed of the air compressor MG1 is zero or when the air compressor MG1 is rotating in the direction in which the air compressor rotates to send oxygen to the fuel cell 10 (step S50, NO), the control unit 61 proceeds the process to step S60, stops the electric power supply from the secondary battery 50, and allows regeneration of the drive motor MG2. In step S60, the control unit 61 uses the input result from current sensor 106 provided in air compressor MG1 to cause drive motor MG2 to output a torque corresponding to the reactive current energized in step S40. The control unit 61 energizes the air compressor MG1 with the reactive current corresponding to the regenerative electric power of the drive motor MG2 so that the regenerative electric power of the drive motor MG2 is consumed. In this way, the braking force resulting from the regeneration suppresses the vehicle 200 from slipping down when starting on a slope, and the vehicle 200 travels in the required traveling direction.

In step S90, when the vehicle is in the first state (step S90, YES), the control unit 61 returns the process to step S60. The case in which the determination in step S90 is negative is a state in which the vehicle 200 has finished starting on the slope. When the vehicle 200 is not in the first state (step S90, NO), the control unit 61 ends the present process routine.

In contrast, when it is detected in step S50 that the air compressor MG1 is rotating in the reverse direction (step S50, YES), the control unit 61 proceeds with the process to step S70, and stops the application of the reactive current to the air compressor MG1 to prohibit application of the subsequent reactive current. In addition, when the application of the reactive current is prohibited in step S70, the control unit 61 does not execute the process of step S40 and thereafter, even if the vehicle 200 is in the first state again after finishing starting on the slope and consumption of the regenerative electric power of the drive motor MG2 due to supplying the reactive current to the air compressor MG1 is not performed. When application of the reactive current is prohibited in step S70, for example, a hill assist control in which braking is applied to each wheel by a brake control device (not shown) that is provided in the vehicle 200 and the brake function is temporarily held on a slope may be executed. In this way, the slipping down when starting on the slope is suppressed and the vehicle 200 travels in the required traveling direction.

According to this form, in the limp-home traveling control when the secondary battery converter 45 fails and the vehicle 200 is in the first state, the regenerative electric power of the drive motor MG2 can be consumed by supplying the reactive current to the air compressor MG1, a braking force can be acquired to suppress the rearward traveling of the vehicle 200, and the vehicle 200 can travel in the request traveling direction. When the reverse rotation of the air compressor MG1 is detected, the reactive current is not supplied after the reverse rotation is detected. Thus, it is possible to suppress a so-called secondary failure in which the air compressor MG1 fails in addition to the failure of the secondary battery converter 45. The failure of the air compressor MG1 includes, for example, failure of a bearing due to reverse rotation of the bearing included in the air compressor MG1.

B. Second Embodiment

Figure 3:
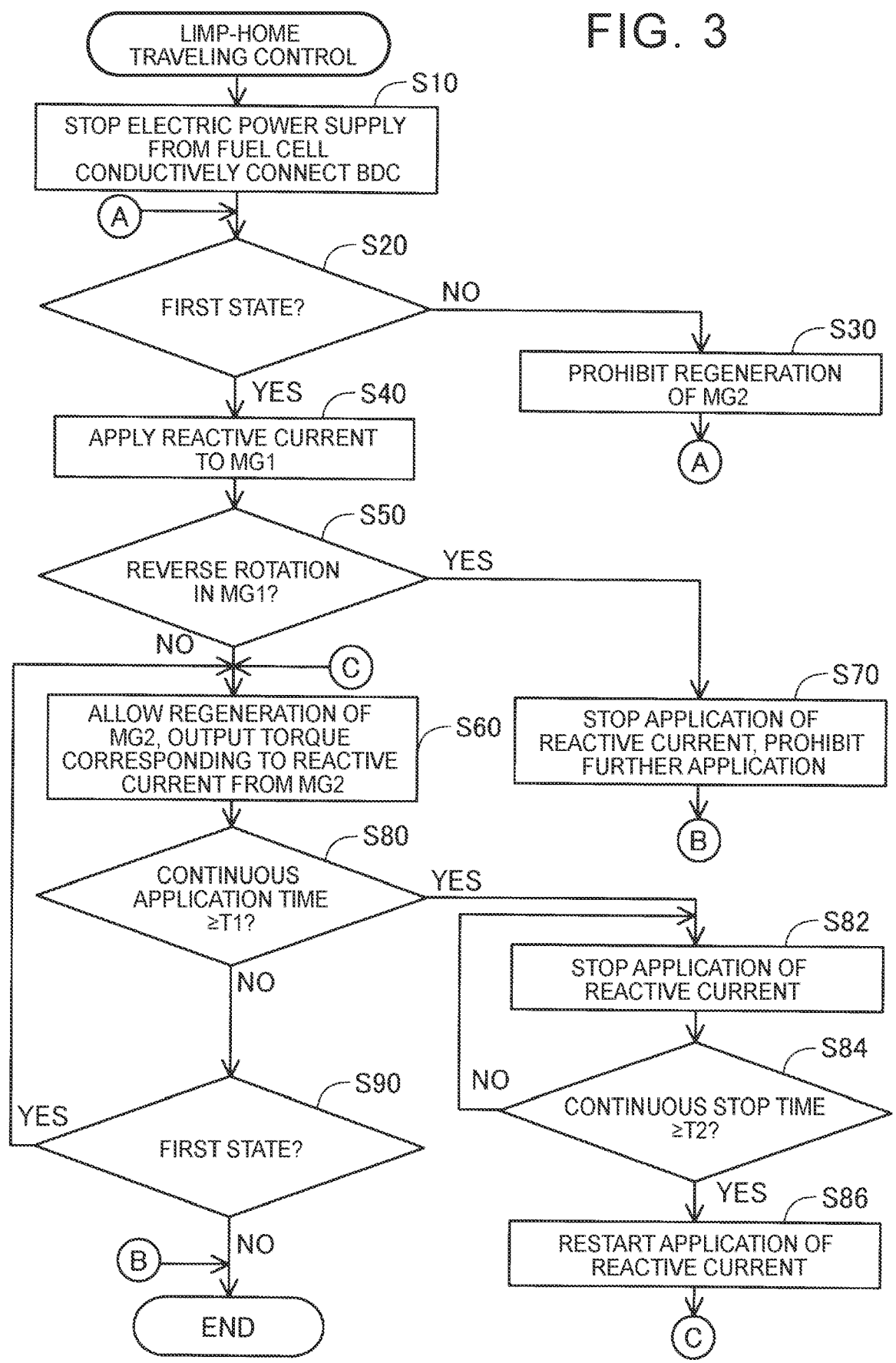
FIG. 3 is a process diagram showing a limp-home traveling control in a second embodiment.

FIG. 3 shows a limp-home traveling control process according to a second embodiment. The second embodiment differs from the first embodiment in that the second embodiment is provided with the process of step S80, step S82, step S84, and step S86 between step S60 and step S90 in FIG. 2 of the first embodiment. Since the configuration of the fuel cell system 100 and the vehicle 200 of the second embodiment and the other steps in the limp-home traveling control are the same, description thereof will be omitted.

After supplying the reactive current to the air compressor MG1 in step S60, the control unit 61 determines in step S80 whether the continuous application time from when the reactive current is started to be supplied to the air compressor MG1 is equal to or more than a first time T1 that is predetermined in advance. The continuous application time is an elapsed time after the reactive current is applied in step S40, for example. The first time T1 is obtained in advance by experiments or simulations by using the relationship between the reactive current application time, the temperature of the air compressor MG1, and the temperature range in which the performance deterioration of the air compressor MG1 can be suppressed. The first time T1 may be 5 seconds, for example.

When the continuous application time is less than the first time T1 (step S80, NO), the control unit 61 proceeds with the process to step S90.

When the continuous application time is equal to or longer than the first time T1 (step S80, YES), the control unit 61 stops energizing the air compressor MG1 with the reactive current in step S82. The case in which the determination in step S80 is affirmative is the case in which the depression amount of the accelerator pedal 201 is extremely less than the depression amount that is expected when the vehicle starts on the slope. While the application of reactive current is stopped, the control unit 61 may cause a display device or a sound device etc. that are not shown and that are installed in the vehicle 200 to notify the operator of information prompting the operator to step on the brake pedal 202. Otherwise, while the reactive current is stopped, braking may be applied to each wheel by a brake control device not shown installed in the vehicle 200 to temporarily maintain the braking function on the slope.

In step S84, the control unit 61 determines whether the time (continuous stop time) after stopping the application of the reactive current is equal to or more than a predetermined second time T2. The second time T2 is acquired in advance by experiments or simulation by using the relationship between the energization stopping time of the reactive current after the continuous application time becomes equal to or more than the first time T1, the temperature of the air compressor MG1, and the temperature range in which the performance deterioration of the air compressor MG1 can be suppressed. The second time T2 is 10 seconds or more, or 15 seconds or more, for example.

When the continuous stop time is less than the second time T2 (step S84, NO), the control unit 61 returns the process to step S82 and continues to stop the application of the reactive current. When the continuous stop time is equal to or more than the second time T2 (step S84, YES), the control unit 61 proceeds with the process to step S86 to restart application of the reactive current, and executes the processes of step S60 and thereafter again.

With this form, overheating of the air compressor MG1 can be suppressed. Thus, it is possible to suppress a secondary failure of the air compressor MG1 caused by overheating, in addition to the failure of the secondary battery converter 45.

C. Other Embodiments

In the above embodiment, the control unit 61 supplies the reactive current to the air compressor MG1 by the output from the secondary battery 50 for the time being, and acquires information on whether the air compressor MG1 rotates in the reverse direction from the reverse rotation detection unit 64 in step S50 (FIG. 2, FIG. 3). When the air compressor MG1 is rotating in reverse, the control unit 61 prohibits application of the reactive current. Instead of the above, the control unit 61 may sequentially acquire information on whether the air compressor MG1 rotates in the reverse direction from the reverse rotation detection unit 64, even after the reactive current is applied to the air compressor MG1 with the regenerative electric power in step S60. When the air compressor MG1 is rotating in reverse, the application of the reactive current after the reverse rotation may be prohibited (step S50, step S70).

In the embodiment described above, the first state determination unit 63 determines whether the vehicle 200 is in the first state, from the detection results of the accelerator pedal sensor 101, the shift position sensor 103, and the vehicle speed sensor 104. In contrast, for example, the first state determination unit 63 may detect that the vehicle 200 is on the slope from an acceleration sensor and a position sensor that measures the position of the vehicle 200, and the first state determination unit 63 may determine that the vehicle 200 is in the first state when a state in which regeneration occurs in the four-quadrant operation is detected. The acceleration sensor and the position sensor are provided in the vehicle 200 and not shown. For example, the first state determination unit 63 may determine that the vehicle 200 is in the first state, when the current position of the vehicle 200 is on the slope, the output torque of the drive motor MG2 is positive, and the rotation speed of the drive motor MG2 per predetermined time is negative.

The present disclosure is not limited to the embodiments described above, and can be implemented in various configurations without departing from the spirit thereof. For example, embodiments corresponding to technical features in each form described in the section of Summary and technical features in other embodiments may be appropriately replaced or combined in order to solve some or all of the above-described issues, or in order to achieve some or all of the effects described above. In addition, besides the technical features that are defined to be nonessential in the specification, technical features that are not defined to be essential in the specification may be deleted as necessary.

What is claimed is:
1. A fuel cell system installed in a vehicle, the fuel cell system comprising:
 a fuel cell;
 a secondary battery;
 a load including a drive motor having a function of a motor generating a driving force of the vehicle and a function of a generator generating a regenerative elec- tric power, and an air compressor configured to supply oxygen to the fuel cell by rotating in one direction;

a fuel cell converter configured to boost electric power from the fuel cell and output electric power to the load;

a secondary battery converter that is provided between the secondary battery and the load, that is configured to boost electric power from the secondary battery and output electric power to the load, and that is configured to step down electric power from the load for charging the secondary battery;

a failure detection unit configured to detect an operation failure of the secondary battery converter;

a first state determination unit configured to determine whether the vehicle is in a first state in which an actual traveling direction that is an actual direction in which the vehicle travels and a required traveling direction that is assumed based on a rotation direction of the drive motor do not match;

a reverse rotation detection unit configured to detect a reverse rotation that is a rotation in a direction opposite to the one direction in the air compressor; and a control unit configured to control the fuel cell, the fuel cell converter, and the secondary battery converter, wherein the control unit is configured to stop supplying electric power to the load via the fuel cell converter and perform a limp-home traveling control for supplying electric power from the secondary battery to the drive motor with the secondary battery converter in a conductive state, when the operation failure of the secondary battery converter is detected, the control unit configured to, in the limp-home traveling control:

prohibit regeneration of the drive motor when the vehicle is not in the first state;

apply a reactive current to the air compressor to cause the air compressor to consume regenerative electric power of the drive motor when the vehicle is in the first state; and not apply the reactive current to the air compressor after the reverse rotation of the air compressor is detected when the reactive current is applied to the air compressor and the reverse rotation is detected.

2. The fuel cell system according to claim 1, wherein the control unit is configured to, when the reverse rotation of the air compressor is not detected in the limp-home traveling control:

stop applying the reactive current when a continuous application time after the application of the reactive current to the air compressor is started has reached a predetermined first time; and restart applying the reactive current when a stop time after the application of the reactive current is stopped has reached a predetermined second time.

3. The fuel cell system according to claim 1, wherein the air compressor is a turbo air compressor.

* * * * *